Patented June 15, 1926.

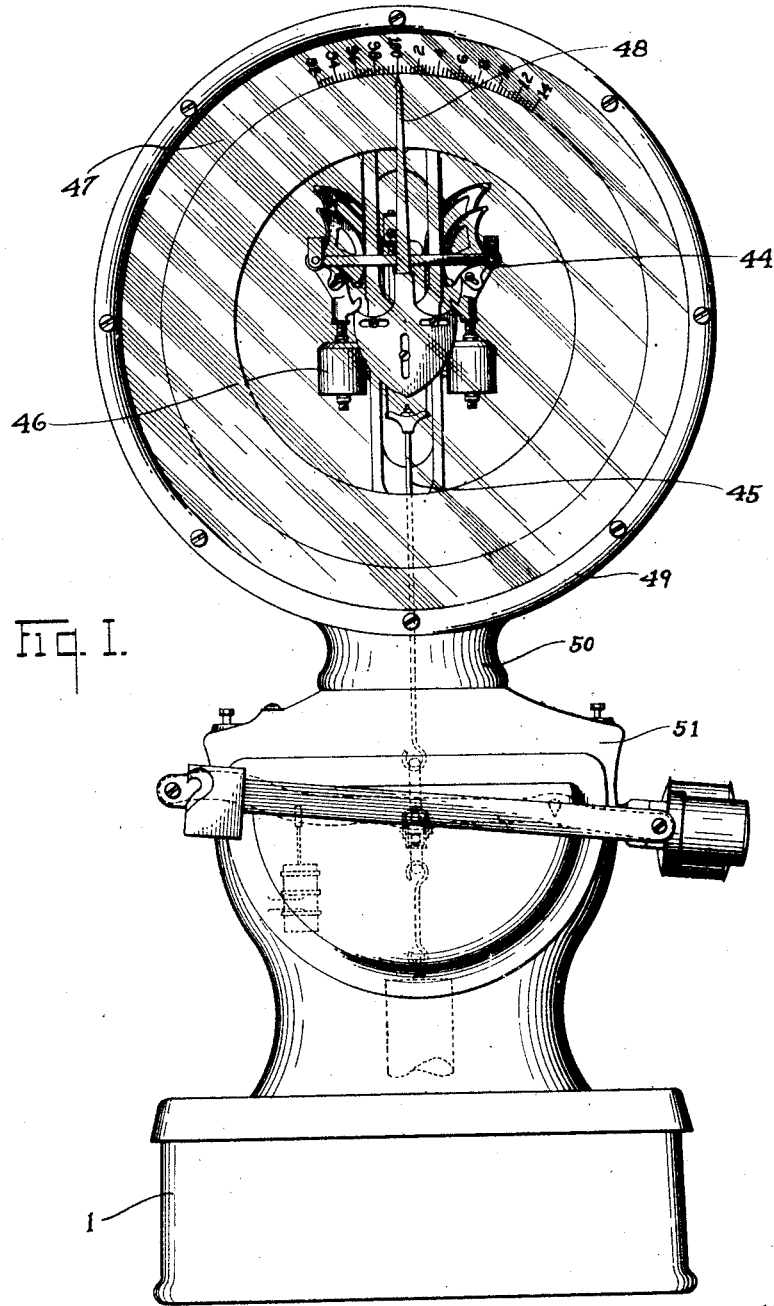

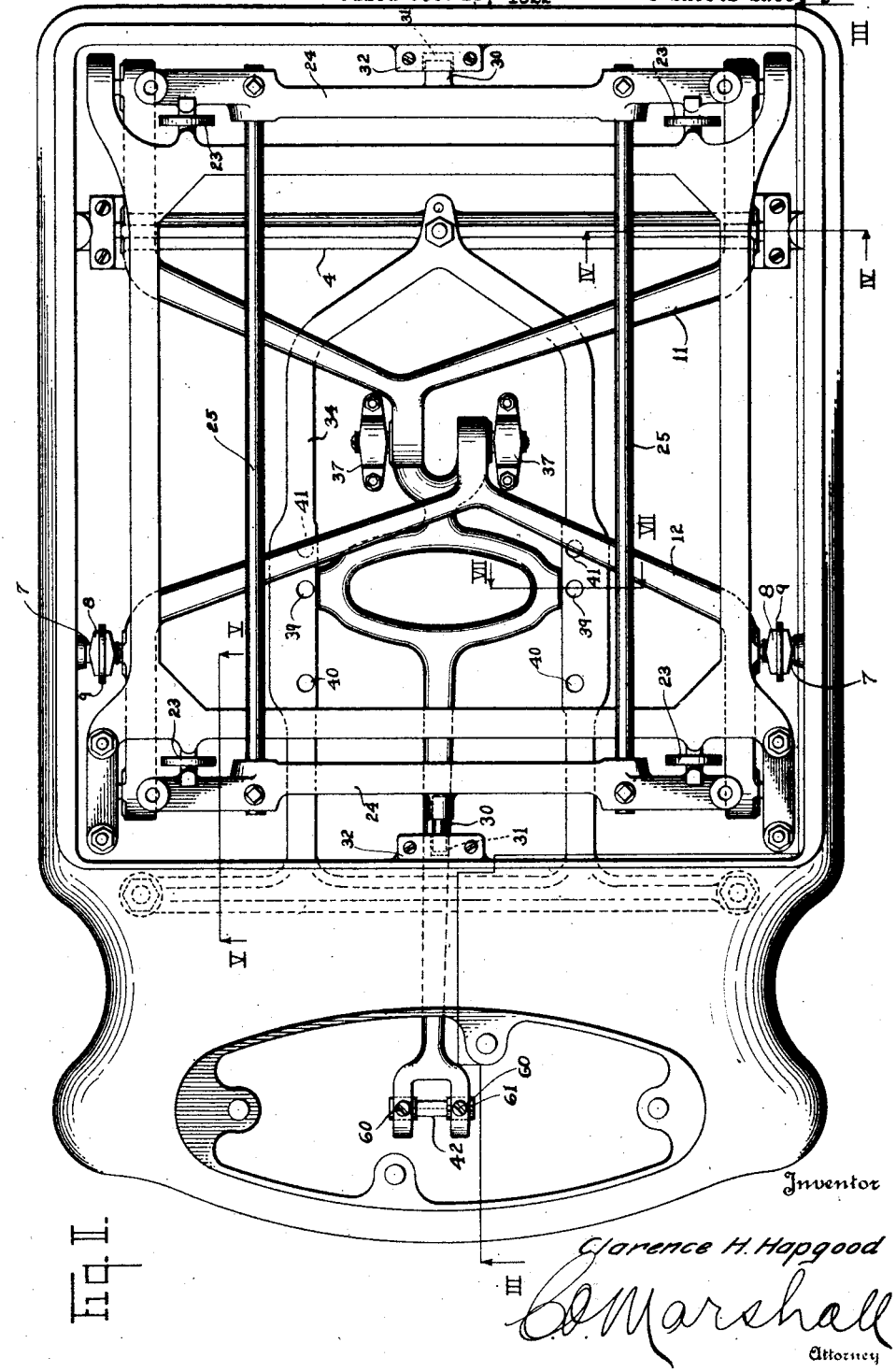

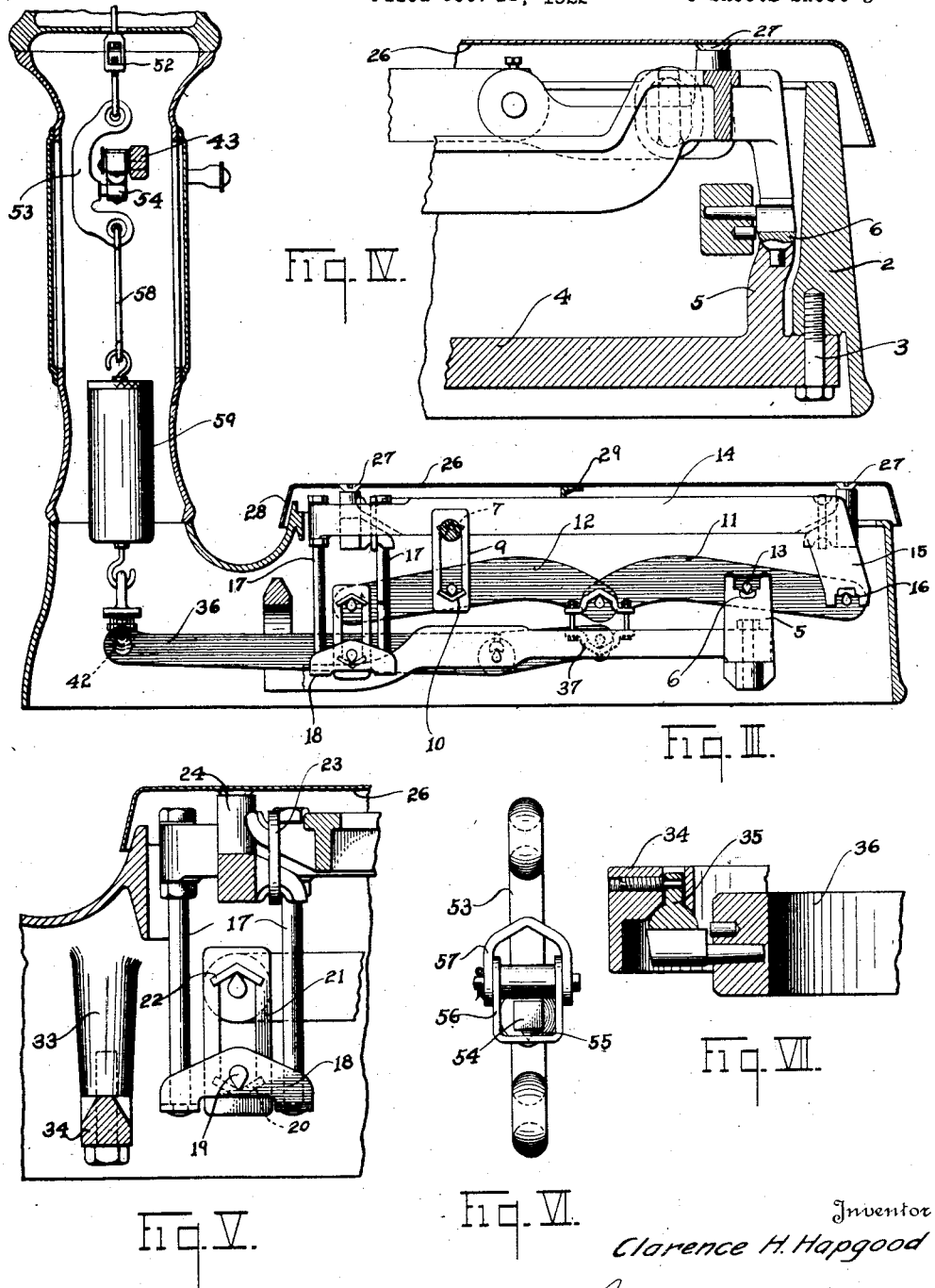

1,588,453

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 16, 1922. Serial No. 607,274.

This invention relates to weighing scales, and particularly to scales adapted for use on factory benches and the counters of mercantile establishments where the commodities to be weighed are of relatively large bulk and heavy weight, though their bulk and weight are not so great as to require the use of floor scales.

One of the principal objects of my invention is the provision of a scale having a relatively large platform supported upon lever mechanism which is so arranged that commodities may be weighed while resting adjacent any of the edges or corners of the platform.

Another object of the invention is to provide platform lever mechanism of relatively low multiplication adapted to support a platform at points lying nearly below the corners of such platform so that there is no liability of the platform's being tipped when a commodity is placed upon it adjacent its edge.

Another object of the invention is to provide lever mechanism adapted to support a relatively large platform at points located nearly below the corners of the platform, the multiplication of the lever mechanism being such that when it is connected to automatic load-offsetting mechanism such as is employed in floor scales adapted to weigh heavy loads, a scale is provided adapted to weigh lighter loads.

Another object of the invention is to provide a scale for weighing loads of medium weight in which the automatic load-counterbalancing mechanism is identical with that employed in scales adapted to weigh heavy loads, so that a standard automatic load-counterbalancing mechanism may be employed for scales of both types.

Another object of the invention is the provision of a scale which, with the change of a single lever in the platform lever mechanism, may be adapted for various capacities.

Another object is the provision of an improved system of platform levers adapted to swingingly support a platform, the parts being so arranged that relative movement of the weighing pivots and their bearings takes place only to provide for changes in the positions of the weighing mechanism as it moves to automatically counterbalance a load.

Another object of the invention is to provide a weighing scale of extreme accuracy and exceptionally sturdy construction, the parts of which are so constructed and arranged as to facilitate their manufacture, assembly and adjustment.

Another object of the invention is to provide a scale having platform lever mechanism which may be adapted for various capacities with the change of a single lever, and having simple and easily operated means to compensate for variations in conditions of plumbness of the linkage in the mechanism which may occur with a change of such lever.

Another object is the provision of an improved device for connecting platform lever mechanism to automatic load-counterbalancing mechanism and a beam lever.

Another object is the provision of an automatic weighing scale having an indicator chart which may be turned to face in any desired direction.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevation of a weighing scale embodying my invention;

Figure II is a plan view of the base and platform lever mechanism of the scale, the platform being removed;

Figure III is a vertical sectional view of a scale embodying my invention, the automatic load-counterbalancing mechanism and its housing being removed, the base and platform lever mechanism being shown in section substantially on the line III—III of Figure II;

Figure IV is an enlarged fragmentary sectional view taken substantially on the line IV—IV of Figure II, the platform also being shown in section.

Figure V is an enlarged fragmentary sectional view taken substantially on the line V—V of Figure II, the platform also being shown in section;

Figure VI is an enlarged elevational view of a connection forming an important part of my invention; and Figure VII is an enlarged fragmentary sectional view taken substantially on the line VII—VII of Figure II and showing the fulcrum of one of the levers.

Referring to the drawings in detail, the base housing 1 of the scale is designed to give the maximum platform area that is practicable in a scale of a size which permits its use upon factory benches and counters of hardware stores and other mercantile establishments. Formed upon each of the side walls of the base housing 1 is a boss 2. The lower ends of the bosses 2 are machined, and fixedly secured to them by means of screws 3 is a transversely-extending bar 4 upon which are formed fulcrum stands 5 which support the fulcrum bearings 6 of one of the platform levers.

Projecting inwardly from each of the side walls of the base housing 1 is a lug 7, the upper side of which takes the form of a knife edge pivot which supports an inverted V-shaped bearing 8 in the upper end of a link 9, the lower end of the link 9 carrying a V-shaped bearing 10 which forms the fulcrum bearing for another of the platform levers.

The platform levers 11 and 12, which are fulcrumed respectively on the fulcrum bearings 6 and 10, are both levers of the first order, and, while they are reversely arranged in the base housing 1, they are of identical construction. The fulcrum pivot 13 of the lever 11 is rockingly supported upon the fulcrum bearing 6, which is preferably universally mounted so that the apex of the V-shaped bearing groove automatically aligns itself with the knife edge of the pivot. The load pivots of the levers 11 and 12 are located substantially in the corners of the base housing 1, as shown in Figures II and III, and supported on the load pivots is a spider 14, one end of which is provided with a pair of downwardly-extending legs 15, in the lower ends of which are mounted self-aligning bearings 16 which are so connected to the legs 15 as to prevent shifting movement of the spider 14. The other end of the spider is provided at each side with a pair of downwardly-extending rods 17, to the lower ends of which is secured a member 18 carrying a pivot 19 which rests in a bearing 20 carried in the lower end of a link 21, the upper end of the link being connected through a similar bearing 22 to the load pivot of the lever 12. With the arrangement above described, when the lever 11 rocks on its fulcrum, the load pivot of the lever 11 moves in an arc about the fulcrum of the lever, carrying with it the spider 14 which, since its other end is suspended by means of the link 21, is permitted to move in an arc about the fulcrum pivot of the lever 11.

Suspended from the spider 14 by means of links 23 is a frame consisting of a pair of bars 24 rigidly tied together by means of rods 25. The platform 26 of the scale, which is secured to this frame by means of screws 27, is preferably of sheet metal construction, having a depending flange 28 and a transverse downwardly-extending fin 29 which engages the rods 25 and serves to support the center of the platform. Since the platform supporting frame is suspended from the spider 14 by means of the links 23, it may swing in any direction, but will always return to approximately its original position. Its swinging movement is limited by lugs 30 which project from the bars 24 into recesses 31 which are formed between the lugs projecting inwardly from the walls of the base housing 1. Plates 32 overlying the lugs 30 prevent the mechanism from accidentally becoming disassembled or deranged.

Secured centrally of the bar 4 and to downwardly-projecting fingers 33 which are formed interiorly of the base housing 1 is a frame member 34 upon which are mounted the fulcrum bearings 35 of a third lever 36. The ends of the lever 36 are bifurcated, and at its load end each furcation is provided with a pivot which is connected by means of an adjustable link 37 to the nose pivot of one of the levers 11 and 12. The links 37 are made individually adjustable so that an even pressure upon the nose pivots of each of the levers 11 and 12 may be obtained.

The frame member 34 is provided, as shown in Figure II, with three sets of bearing seats 39, 40 and 41, so that the capacity of the scale may be changed by changing the third lever 36, the other parts of the platform lever mechanism being standard for all three scale capacities. The nose pivot 42 of the lever 36 is connected by a series of links to the tare beam lever 43 and the automatic load-offsetting mechanism 44 of the scale. Since my present invention does not reside in the automatic load-offsetting mechanism per se, and since the automatic load-offsetting mechanism illustrated is of a type which is widely known and used, I will not describe it further than to say that when a downward pull is exerted upon the link 45 the pendulums 46 swing upwardly and outwardly until the pull on the link 45 is counterbalanced. The weight of the load on the scale is indicated by means of a dial 47 and an indicator hand 48, and the watch-case-shaped housing 49 which contains the automatic load-counter-balancing mechanism and the dial 47 and hand 48 is provided with a circular collar 50 which is turnably mounted on the upright supporting housing 51 so that the dial may be faced in any desired direction, the link 45 being provided with a swivel 52 to permit relative turning movement of its upper and lower ends. The lower end of the link 45 is connected to the upper end of a bowed link 53, the link 53 having a laterally-projecting pivot bar 54 which is provided with a cone pivot 55, the cone pivot 55 being connected by means of a pair of bearing links 56 and 57 to the load pivot of the tare beam lever 43.

The lower end of the bowed link 53 is connected by means of a rod 58 and a loading box 59 to the nose pivot 42 of the lever 36. When the lever 36 and the tare beam lever 43 swing in arcs about their respective fulcrum pivots, the connection from the bowed link 53 to the tare beam lever permits the relative movement of the levers 36 and 43 without affecting the direct pull from the lever 36 to the automatic load-offsetting mechanism 44.

When the capacity of the scale is changed by substituting a lever 36 of different multiplication, the initial pull exerted by the weight of the platform, platform supporting spider, etc. is also changed. The loading box 59, however, provides means for increasing the initial pull on the automatic load-offsetting mechanism when the effect of the weight of the platform, platform supporting spider, etc. is decreased. When the effect of the weight of the platform, platform supporting spider, etc. is decreased by substituting a lever 36 of different multiplication, the load in the loading box 59 may be increased to the extent necessary to bring the indicator hand 48 to zero position, and when the effect of the weight of the platform, platform supporting spider, etc. is increased by substituting a lever 36 of different multiplication, the load in the loading box may be decreased to the extent necessary to compensate for the increase in the effect of the weight of the platform, platform supporting spider, etc.

The angular movement of the levers 11 and 12 which is necessary for a given movement of the automatic load-counterbalancing mechanism varies with changes in the multiplication of the lever 36. The less the multiplication of the lever 36, the greater the angular movement of the levers 11 and 12.

Movement of the platform levers results in changes in the condition of plumbness of the links 9, 21 and 37, and it is desirable to provide a simple means of adjustment to compensate for such changes in condition of plumbness. According to my invention, the adjustment is made by moving the nose pivot 42 of the lever 36 laterally and thus changing the condition of plumbness of the connections between the lever 36, the tare beam lever 43 and the automatic load-offsetting mechanism. The nose pivot 42 is formed of a round bar of hardened steel inserted in round openings passing laterally through furcations in the nose end of the lever 36, the bar being cut away at its center to form a knife edge pivot, the edge of which coincides with the longitudinal axis of the bar so that the position of the edge will not be changed if the bar rotates slightly in the openings in which it is mounted. Such rotation is, however, prevented by set screws 60 which seat in grooves 61 in the upper sides of the ends of the pivot bar. By loosening the set screws 60 and sliding the bar endwise, the condition of plumbness of the connections between the lever 36, the tare beam lever 43 and the automatic load-counter balancing mechanism of the scale may be altered to the extent required to compensate for changes in the condition of plumbness of the links of the platform lever mechanism.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a base housing, a separable member secured to said base housing, a second separable member secured at two places to said base housing and at one place to the first said member, and fulcrum bearings on said members.

2. In a weighing scale, in combination, a base housing, a separable member secured to said base housing, a second separable member secured at two places to said base housing and at one place to the first said member, fulcrum bearings on said members, and a plurality of additional seats on the said second member adapted to selectively receive the fulcrum bearings.

3. In a weighing scale, in combination, a base housing, a pair of non-swinging fulcrum bearings and a pair of swinging fulcrum bearings supported within said base housing, a pair of levers of the first order having load pivots, one of said levers being fulcrumed on said non-swinging bearings, the other of said levers being fulcrumed on said swinging bearings, and a platform spider non-swingingly supported on the lever with non-swinging fulcrum bearings and swingingly supported on the lever with swinging fulcrum bearings.

4. In a weighing scale, in combination, a base housing, a pair of non-swinging fulcrum bearings and a pair of swinging fulcrum bearings supported within said base housing, a pair of levers of the first order having load pivots, one of said levers being fulcrumed on said non-swinging bearings, the other of said levers being fulcrumed on said swinging bearings, a platform spider non-swingingly supported on the lever with non-swinging fulcrum bearings and swingingly supported on the lever with swinging fulcrum bearings, a third lever fulcrumed on non-swinging bearings within said base housing, and link connections between said third lever and the first said levers.

5. In a weighing scale, in combination, a pair of platform levers of the first order, said levers having load pivots, a spider supported on the load pivots of said levers, a frame swingingly supported from said spider, and a platform fixed on said frame.

6. In a weighing scale, in combination, a pair of platform levers, means whereby extension levers of different multiplications may be selectively assembled with said platform levers, load-counterbalancing mechanism, means for connecting said load-counterbalancing mechanism to the particular extension lever employed, and means for varying the condition of plumbness of said connecting means to compensate for varying conditions of angularity and plumbness in the platform lever mechanism.

7. In a weighing scale, in combination, a pair of platform levers, means whereby extension levers of different multiplications may be selectively assembled with said platform levers, load-counterbalancing mechanism, means for connecting said load-counterbalancing mechanism to the particular extension lever employed, and means for varying the condition of plumbness of said connecting means to compensate for varying conditions of angularity and plumbness in the platform lever mechanism, said means including a laterally adjustable nose pivot on the particular extension lever employed.

8. In a weighing scale, in combination, a pair of platform levers, means whereby extension levers of different multiplications may be selectively assembled with said platform levers, load-counterbalancing mechanism, said load-counterbalancing mechanism including a lever swinging in a plane perpendicular to the plane of movement of the extension lever, means for connecting the extension lever and the lever of the load-counterbalancing mechanism, and means, including a laterally adjustable nose pivot on the extension lever, for varying the condition of plumbness of said connecting means to compensate for varying conditions of angularity and plumbness in the platform lever mechanism.

9. In a weighing scale, in combination, platform lever mechanism, load-counterbalancing mechanism, means connecting said load-counterbalancing and platform lever mechanisms, means for varying the multiplication of said platform lever mechanism, and a loading box adapted to be weighted or lightened to compensate for changes in initial pull resulting from variations in the multiplication of said platform lever mechanism.

10. In a weighing scale, in combination, platform lever mechanism, load-counterbalancing mechanism, means connecting said load-counterbalancing and platform lever mechanisms, means for varying the multiplication of said platform lever mechanism, and a loading box associated with said connecting means and adapted to be weighted or lightened to compensate for changes in initial pull resulting from variations in the multiplication of said platform lever mechanism.

11. In a weighing scale, in combination, platform lever mechanism, automatic load-counterbalancing mechanism, a tare beam lever, connections between said platform lever mechanism and said automatic load-counterbalancing mechanism, said connections including a bowed link passing around said tare beam lever, a pivot on said bowed link, a pivot on said tare beam lever, and link means connecting said pivots.

12. In a weighing scale, in combination, a base housing, platform lever mechanism supported therein, an upright housing supported upon said base housing, a tare beam lever supported in said upright housing, a casing turnably mounted on said upright housing, automatic load-counterbalancing and indicating mechanism in said casing, a swivel connection between said platform lever mechanism and said automatic load-counterbalancing mechanisms, and link means connecting said connection and said tare beam lever.

CLARENCE H. HAPGOOD.